US007351151B1

(12) United States Patent
Crowder, Jr.

(10) Patent No.: US 7,351,151 B1
(45) Date of Patent: Apr. 1, 2008

(54) GAMING BOARD SET AND GAMING KERNEL FOR GAME CABINETS

(75) Inventor: Robert William Crowder, Jr., Las Vegas, NV (US)

(73) Assignee: Sierra Design Group, Las Vegas, NV (US)

( * ) Notice: Subject to any disclaimer, the term of this patent is extended or adjusted under 35 U.S.C. 154(b) by 603 days.

(21) Appl. No.: 10/224,026

(22) Filed: Aug. 19, 2002

Related U.S. Application Data

(60) Provisional application No. 60/313,743, filed on Aug. 20, 2001.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/43; 463/16; 463/17; 463/18; 463/19; 463/20; 463/30; 463/35; 463/40; 463/47

(58) Field of Classification Search ............ 463/46, 463/42, 44–45, 16–20, 30, 35, 40, 43, 47
See application file for complete search history.

(56) References Cited

U.S. PATENT DOCUMENTS 5,515,514 A * 5/1996 Dhuey et al. ............... 710/301
5,915,131 A * 6/1999 Knight et al. ................ 710/72
6,035,356 A * 3/2000 Khan et al. ................. 710/301
6,275,893 B1 * 8/2001 Bonola ....................... 710/262
6,450,887 B1 * 9/2002 Mir et al. ..................... 463/42
6,480,919 B2 * 11/2002 Bonola ....................... 710/262
6,804,763 B1 * 10/2004 Stockdale et al. ........... 711/170
6,866,581 B2 * 3/2005 Martinek et al. ............. 463/16
2001/0053712 A1 * 12/2001 Yoseloff et al. ................ 463/1
2002/0052230 A1 5/2002 Martinek
2002/0082084 A1 6/2002 Snow
2003/0224858 A1 * 12/2003 Yoseloff et al. .............. 463/43
2007/0015590 A1 * 1/2007 Jackson et al. ............... 463/43

FOREIGN PATENT DOCUMENTS

WO    WO 00/06268    2/2000

\* cited by examiner

*Primary Examiner*—Robert E. Pezzuto
*Assistant Examiner*—Jason Pinheiro
(74) *Attorney, Agent, or Firm*—Russ F. Marsden; Andrew B. Chen; J. P. Cody

(57) ABSTRACT

The present invention is a method and apparatus enabling a low cost hardware upgrade path and low cost processor board retrofit for gaming machines. The enabling features include a two-board set made up of an industry standard form factor processor board (a single board system, able to support an operating system) coupled to an I/O adapter board, and further having a specially architected game kernel based on a UNIX-compatible operating system. The game kernel provides a consistent API to game applications, enabling quick and easy use of new hardware features while providing backward compatibility for existing game applications.

31 Claims, 5 Drawing Sheets

General Prior Art Upright
Gaming Machine,
Side View

Two Board Processor Board Set According To The Present Invention

IGT Processor Board
(Prior Art Processor Board)

Gaming Kernel According To The Present Invention

GAMING BOARD SET AND GAMING KERNEL FOR GAME CABINETS

RELATED APPLICATIONS

This application claims the benefit of the filing date of provisional application 60/313,743 which was filed on Aug. 20, 2001, entitled "Form Fitting Upgrade Board Set For Existing Game Cabinets".

BACKGROUND OF THE INVENTION

1. Field of the Invention

This invention pertains generally to gaming systems. More particularly, the present invention relates to a method and apparatus for providing high performance, incremental and large upgrades, and a consistent game development API for gaming cabinets, both existing and new.

2. The Prior Art

Gaming industry cabinets are fairly standardized as to general configuration. This is partly due to the needs of the casinos, who want to fit the maximum number of gaming devices into a given amount of floor space. It is also due to the physical needs of players, who need a certain minimum amount of cabinet area in front of them to play the game while not crowding their fellow players on the next gaming machine. It is also due to the requirements of the game components, encompassing both regulated and non-regulated aspects. Game components include a video monitor or reels, input and output devices (buttons, network interface, voucher or ticket printers, and magnetic strip card readers are typical) together with a main processor board. The main processor board has interfaces to the various input and output devices, and has at least a processor and memory which enables gaming software to be installed and run on the processor board. In most gaming machines the processor board, power supply and other related mechanical and electrical elements are typically co-located near the base of the gaming machine. Disposed thereabove at proximately chest level of the player is the gaming display, such as the rotatable reel displays in a slot machine or a video monitor for video-based games.

FIG. 1 illustrates a common prior art gaming machine. The gaming machine 100 has a top candle 108, a video screen or reel area 102, player input area 104 (generally having buttons, coin-in and/or bill-in, card reader, and in newer machines a printer), and pull handle 106. Gaming machine 100 has, in its interior, a processor board whose location is generally indicated as 110 (the actual processor board and mounting hardware are on the inside of the cabinet).

The processor board, in addition to have physical mounts such as guides, rails, standoff mounts, board slots, board slides, or board tray, will further have cabinet electronic interfaces, typically at the back of the board (towards the front of the cabinet, from a player's perspective). Processor boards will typically have a set of multi-pin plugs or bus connectors that slide into mating plugs or bus connectors when the processor board is correctly seated in its mounts.

FIG. 2 shows a picture of a prior art processor board 200, in this case a processor board from an IGT® GAME KING® gaming machine. Shown is the top of the board, with the front of the board facing the bottom of the figure. As is typical, the sides of the board slide into the game cabinet using guide rails in the cabinet, with the cabinet bus or connector interfaces 202 mating to specially positioned and configured plugs in the cabinet.

If the board needs work, the entire processor board is replaced. In addition to a replacement board from the manufacturer (in this case IGT®), there are commercially available replacement boards having the same or nearly the same features, speed, memory capacity, etc., from aftermarket manufacturers. No matter where the board originates from, they follow the same configuration, that is, they consist of a single board that replaces the processor board supplied with the game having similar functionality and the same form. In addition to their physical similarity, they employ a monolithic software architecture; that is, the game-cabinet-specific operating system and specific game software are not a modular, layered design using modern software engineering practices. An example of an aftermarket replacement processor board for the IGT® GAME KING® gaming cabinet is or was sold by HAPP CONTROLS™, 106 Garlisch Drive, Elk Grove, Ill. 60007. It has the same basic physical, electronic, and software architecture as the original.

Upgrade processor boards are also available for some games. The reason for considering upgrade boards is that it may be possible to run newer games in a cabinet already owned by a casino if improvements are made to processor speed, memory, graphic support chips, and other components. Game upgrades interface to some degree with the internal busses of the game cabinet, but require cabinet modifications. Currently available upgraded boards do not fit in the slot used by the original processor board; rather, they must be mounted elsewhere in the cabinet. In addition to requiring the accompanying mechanical fabrication and electrical work, the upgrade boards are a fixed upgrade. That is, if the configuration of the upgraded game itself needs to be upgraded a few years later, you have to purchase and install a completely new upgrade kit which requires going through the same installation problems that were encountered with the original upgrade. This is a significant deterrent to upgrading activity.

In addition, each proprietary processor board as well as upgraded game boards typically uses its own interface to the game software, requiring game rewrites each time a hardware upgrade occurs. This makes gradual or incremental game enhancement prohibitively expensive.

Thus, there is a long-felt need for a game processor usable in upgrades in existing cabinets, as well as usable for new game cabinets, that is more cost effective, is easier to install, provides for incremental upgrades itself, and provides more standard interfaces to the game development community.

BRIEF DESCRIPTION OF THE INVENTION

The present invention overcomes the limitations of the prior art by providing a combination two-board processor board set and a gaming kernel that provides a consistent, easy to use API to game application software. The two-board processor board set includes an industry standard form factor processor board (single board computer system able to support an operating system) coupled with an I/O adapter board. The I/O adapter board is unique for each game machine (game cabinet) application.

The I/O adapter board interfaces the industry standard processor board to the game machine's devices. Further, the I/O adapter is intended to provide functionality not found in the industry standard processor board, such as additional com ports, stereo sound and additional power for heavier speakers, additional ethernet support, etc.

Further provided is a gaming kernel which uses a UNIX-compatible operating system. The gaming kernel is uniquely architected to both allow game applications to make use of all the hardware features of the game cabinet and the two-board processor board set, while masking all the hardware-specific, low-level differences between game machines (game cabinets) and their player interfacing devices. This is achieved by (i) providing a single API for the game applications, and (ii) building the intelligence for dealing with devices and hardware capabilities into user-level code modules, rather than device-specific drivers inside the operating system. The later in particular is unique, as prior art systems build these capabilities into the lower-level drivers (this method is used by current game machine manufactures), or in some cases it has been proposed to push them out into smart I/O interfaces to enable the use of a common game engine (e.g., see US Application Publication 2001/0053712).

The present invention does not use a common gaming engine like that described in US Applications 2001/0053712 and 2002/0052230, nor does it use two CPUs with only one for gaming as described in US Application 2002/0082084, nor does it describe pushing I/O intelligence out to the peripherals or the I/O board controlling the peripherals, such as described in the PCT Application WO 00/06268. It is different from any of these: it uses an industry standard processor board, but with a game-machine-specific gaming kernel running on the processor board, coupled with a I/O adapter that is as dumb as possible. The intelligence required to run the gaming machine's devices is found in the gaming kernel software, running on the processor board. This discloses and teaches a fundamentally different approach than is currently used in gaming machines or is shown in the art.

DETAILED DESCRIPTION OF THE PREFERRED EMBODIMENTS

Figure 1:
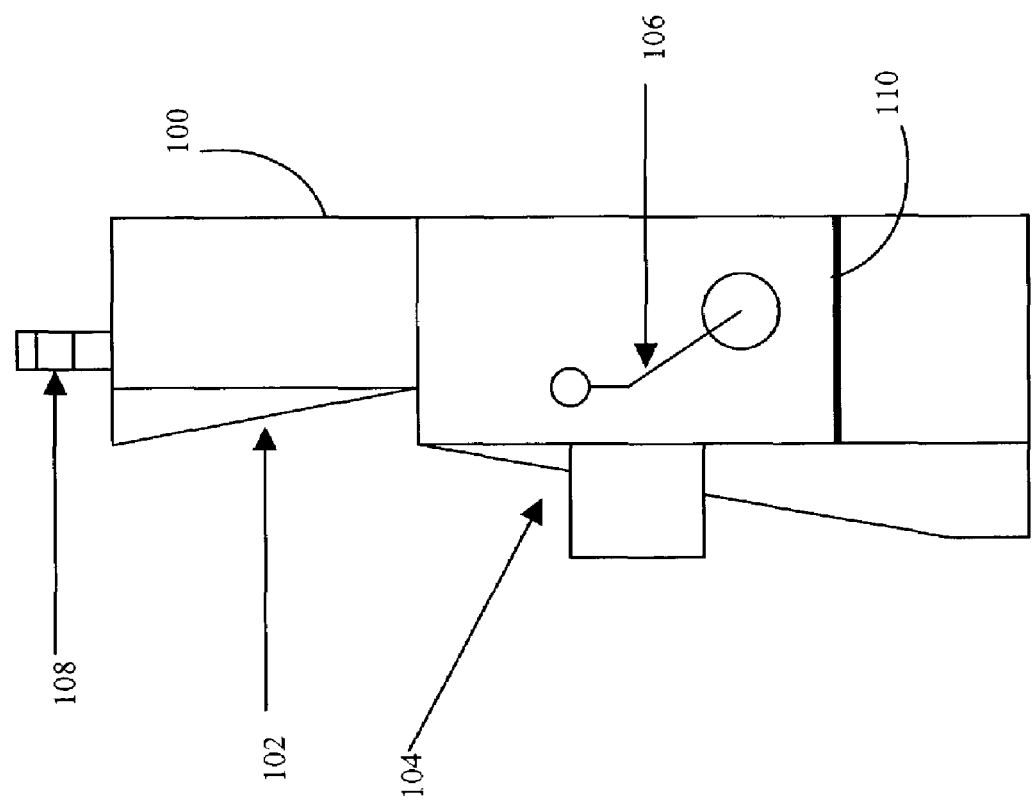
FIG. 1 is a diagram of a prior art game cabinet showing a prior art processor board location.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 1 through FIG. 5. It will be appreciated that the apparatus may vary as to configuration and as to details of the parts, and that the method may vary as to details, partitioning, and the order of acts in a process, without departing from the inventive concepts disclosed herein.

The present invention provides a new and dramatically more cost effective way for owners of aging games (hardware and software) to upgrade their existing cabinets to incorporate new hardware features and capabilities, as well manufacturers of new game cabinets to insure a new, novel, and easy to access upgrade paths to help stave off obsolescence in an industry where games often have lives of 6 months or even less.

The present invention provides for easy hardware and game-level software upgrades (user-level or application level software, from the operating system's viewpoint and when in a modular and layered software environment such as that provided by the present invention), not previously available. This includes being able to easily and economically upgrade hardware that incorporates faster CPUs, busses, etc., as well as incorporating new features such as Ethernet connectivity, stereo sound, and high speed/high resolution graphics. In addition to the ease of upgrading hardware capabilities, the present invention further provides a game kernel which, by providing a callable, consistent user-interface API to the new hardware, makes game programming changes for the game-level programmers minimal after a hardware upgrade. It also provides for backward compatibility, enabling gaming machine owners to upgrade hardware, install the game kernel supporting the new hardware (described in more detail below, but fundamentally installing the libraries that support the added or new hardware capabilities), but wait to upgrade the game software until any later time.

In addition, the game kernel and two-piece processor board introduced in the present invention allows game-level programmers to design and build games using the same game application interface across multiple manufacturers' cabinets, resulting in a huge development savings when compared to the prior art.

Figure 2:
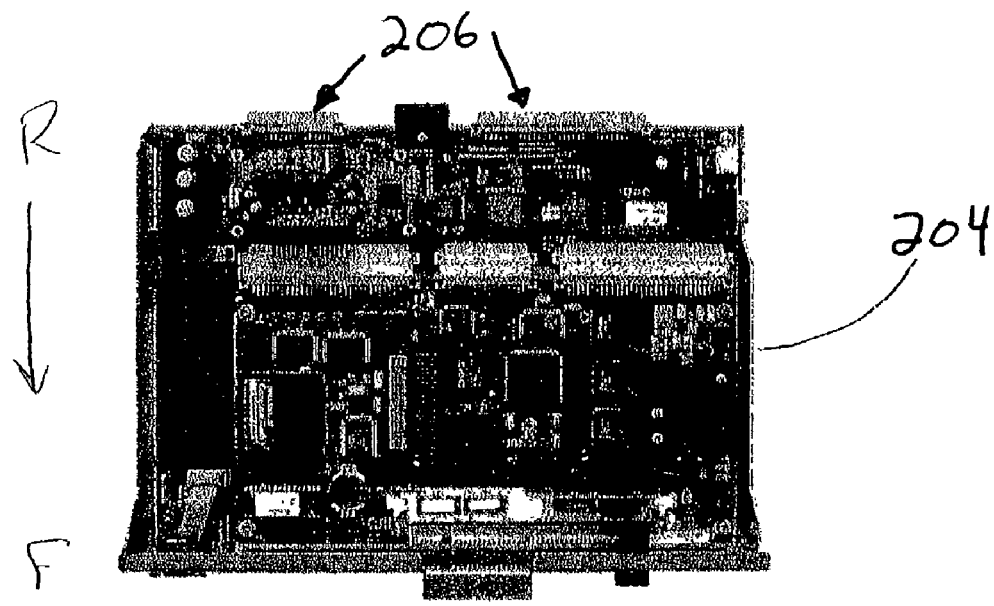
FIG. 2 is a diagram of a prior art processor board and a two-board processor board set according to the present invention.
Figure 2:
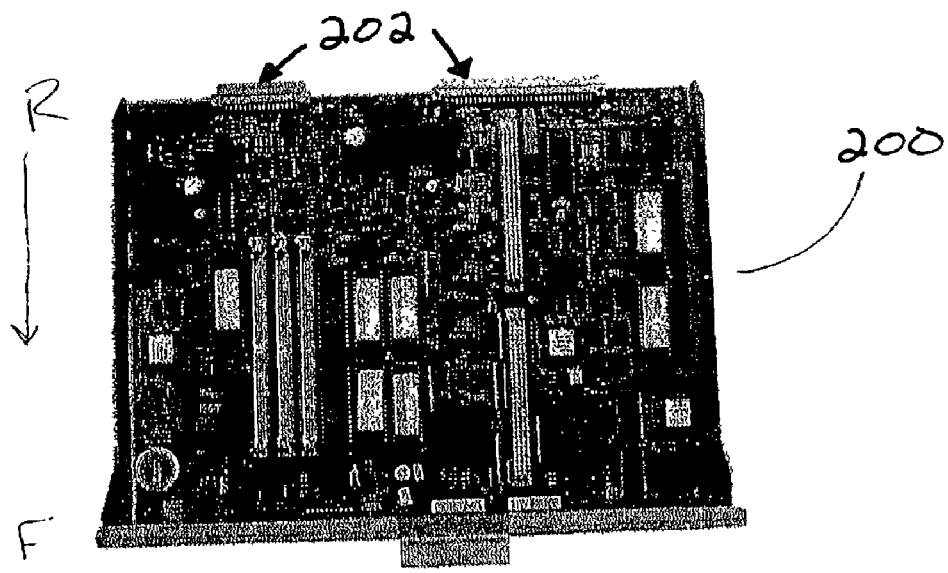

FIG. 2 shows two game processor boards. Board 200 is a prior art processor board from an IGT® game cabinet. Board 204 is a processor board according to the present invention, called a two-board processor board set. Note that it is designed to be a swap-fit with the original, prior art board. It will use the same physical board mounts (slides, guides, rails, etc.) inside the cabinet, and will connect to the cabinet wiring using compatibly placed connectors 206. Note that in any particular replacement board set, there may be some individual connectors, pins, or pin positions not used, because player I/O devices were changed, added, and/or other considerations. However, the supplied connectors will make the game machine (cabinet) functional for game play. For added functionality, there will typically be additional connectors supplied over and above those on the processor board being replaced. This allows the two-board set of the present invention to be a simple swap replacement for the old processor board. This is a huge improvement over other upgrade boards, which require casino personnel to install the prior art replacement processor board in a new physical location within the game cabinet, including figuring out where to mount the new board mounting hardware as well as the attendant problems of fitting new connectors.

For the purposes of this disclosure, the processor board that came with the game cabinet as first delivered from the manufacturer to a customer will be called the OEM (Original Equipment Manufacturer) processor board. Further, the mounting system for the OEM processor board, in whatever form the game cabinet was delivered, is called the OEM mount, mounts, or mounting system. It is to be understood that the OEM mounts may be any implementation, including but not limited to slides, rack-mount, stand-offs, guides, blocks, rails, trays, etc. Whatever mounting system or mounts were used when the game was first manufactured is included in the definition of OEM mount(s).

Figure 3:
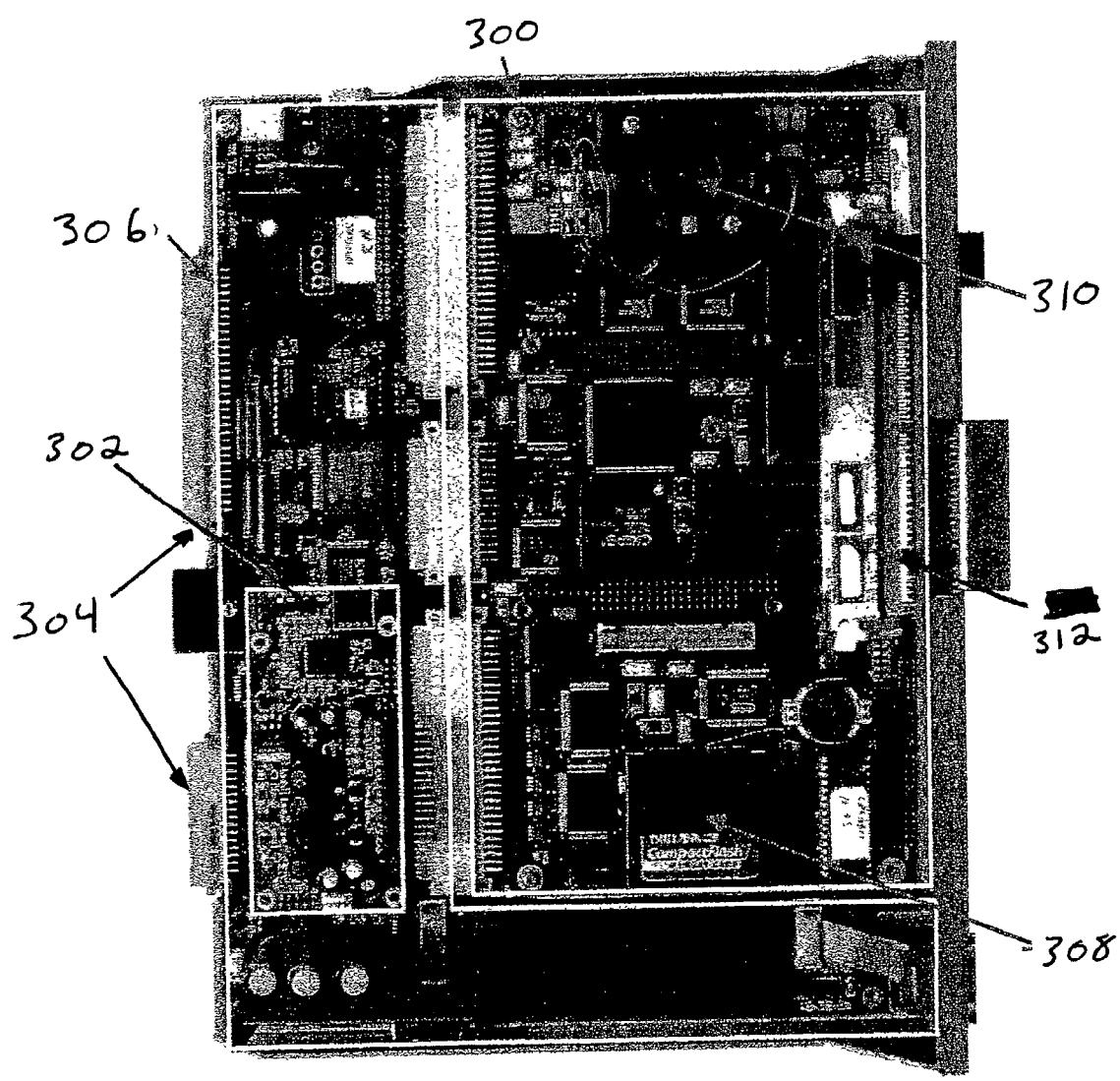
FIG. 3 is an illustration of a two piece replacement processor board according to the present invention.

FIG. 3 shows more details of an example two board set to replace the traditional processor board. A very important feature is that the replacement processor board is made up of two boards, a first board 300 and a second board 306. The two boards are plugged together, using the three visible multi-connector plugs between the two boards (no pointer provided to help keep visual clutter to a minimum).

Board 300 is an industry standard processor board, such as a Netra AX2200 from SUN MICROSYSTEMS of California, or the SE440BX-2 or CA180 from INTEL CORPORATION of California. Both can be purchased in an industry standard form factor, and are configured to support at least one operating system (including embedded operating systems). By "industry standard form factors", this disclosure means any board form factor that has been agreed to by more than one board manufacturer. Such form factors typically have publicly available specifications, often using an industry funded organization to keep the specifications such as the Desktop Form Factors Organization. Examples of form factors whose specifications may be found there include the ATX, MicroATX, NLX, and FlexATX. There are other industry standard form factors as well. In addition, there are other specifications that are understood to be a consideration in the industry and in the selection of an industry standard form factor for use in the current invention, but are not explicitly discussed in this disclosure. One such consideration is height. Older rack mounted systems might have been based on 4U or 6U racks, with boards having a larger perimeter measurement than desktop form factors. Now, manufacturers are targeting 2U or even 1U racks. Because it is generally the case that height is not an issue in pre-existing game cabinets, height considerations (as well as some other form factors) are not explicitly discussed herein. However, it is to be understood that should such considerations become necessary, all such considerations are included in the description of "form factors" as used herein. Any board having at least a CPU or a CPU socket, having any industry standard form factor, and being designed to be a system in the sense of enabling at least one operating system (including an embedded operating system) to run on it, will be referred to as processor boards for the purposes of the disclosure.

Board 306 is a unique board created by Sierra Design Group (SDG) for the purposes of creating a form fitting and functionally compatible replacement processor board (when coupled with board 300) for the OEM processor board found in game cabinets currently in use. The board set is also intended to be used in new gaming cabinets when new game cabinets are designed from the ground up with the board set of the present invention, with an I/O adapter board designed specifically for the new cabinet. Existing game cabinets used with the present invention might be from IGT®, BALLY®, WMS®, or other preeminent game manufacturers. Further, each of these game manufacturers is typically selling several game cabinets, each with their own processor board, at any given time. Board 306 is specially designed and manufactured for each targeted game cabinet, with board 300 and board 306 configured to form a plug-compatible, functionally compatible and functionally enhanced, and form-fit-compatible replacement processor board. As part of this plug-in compatibility, game cabinet interface connectors 304 mate directly with the plugs in the game cabinet for which the processor board is designed. Note that it may be the case that a subset of the pre-existing game cabinet's plugs (or pins in a plug) are used, where the unused plugs (or pins) do not mate to a compatible plug on the processor board set of the present invention. The processor board set is still plug compatible, however, because the remaining plugs (or pins) are designed to be functionally compatible with the subset they do interface with, with the unused plugs (or pins) being taken into consideration during the design of the processor board set such that there will be no interference with the other plugs (or pins), fully enabling a swap-fit.

Thus, it is to be understood that swap-fit does not imply identical connector mappings or identical connector configurations; rather, swap-fit means that the processor board set of the present invention replaces the OEM processor board in such a manner that is uses the OEM mounts, and interfaces to such existing plugs/pins/opto-isolators/connectors/connector-blocks/bus-connectors (collectively: connectors) that enables all player devices to be used in the existing game cabinet to be functionally connected to the processor board set of the present invention.

"Player device" and "player devices" are defined to mean any and all devices that a player may see, hear, touch, or feel. Some are passive (in the sense that a player only receives information from them, such as a video screen and speakers), while others are active (buttons, handles, levers, touchscreens, etc.). Both types are included when using the words "player devises" in general.

Boards such as 306 are called game cabinet adapter and functional enhancement boards, or I/O adapter boards, for the purposes of this disclosure. A processor board coupled with an I/O adapter board is called a two-board processor board set. Note that for certain applications, it may be the case that the applicable I/O adapter board could be made that is an adapter board without additional functional enhancements, to fit an existing game cabinet. This is not expected to be a preferred embodiment, as the cost to provide enhancements (like addition communications ports) is small enough relative to the cost of the overall two-board set as to make the additional functionality well worth the incremental costs.

The creation of a replacement processor board made up of board 300 and board 306, or two-board processor board set, opens many optional upgrading and game enhancement paths for game box manufacturers, game developers, and casino owners. For example, 302 points to a portion of board 306 which incorporates stereo sound capabilities, including an amplifier to drive higher wattage speakers than found in a standard game cabinet. This allows the game software that is running on the two-board processor board set of the present invention (coupled with the gaming kernel), without any changes, to make use of stereo audio output. For best results, the standard mono speakers in the game cabinet should then be upgraded to stereo audio speakers; this can be easily done with the present invention by merely replacing the speakers with new ones. Now the game will suddenly have full stereo sound, able to drive speakers having significantly higher wattage ratings. If the speakers are not upgraded, both signals will be send to the standard plug into the existing game cabinet wiring and speakers, allowing the game to function exactly as before. This enables, at a later date as investment capitol becomes available (or if a new game requires stereo audio capabilities, especially helpful for use with sight impaired game players), the cabinet can be upgraded with new speakers and the stereo output is already available—no further changes will be required. This one example shows how the two-board processor board set allows both hardware and software upgrades in a gradual manner, as investment capitol becomes available. This incremental upgrading capability, including the use of both hardware and software incremental upgrades, has heretofore been unavailable.

Returning now to board 300, a few of its major components are indicated such as processor chip 308 (a socketted Pentium 266 in one preferred embodiment), memory slot 312, and compact flash program storage 310.

Figure 4:
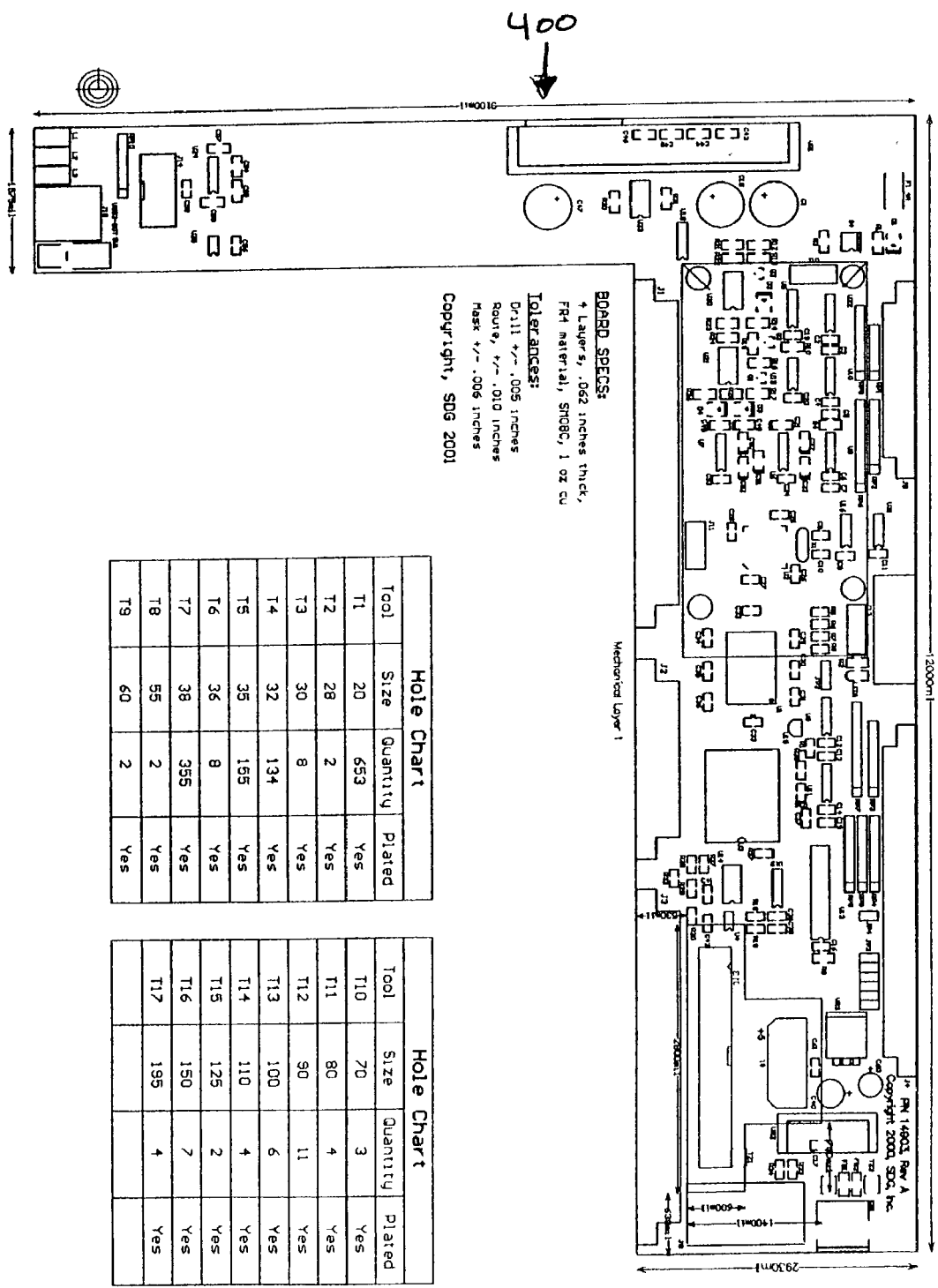
FIG. 4 is a drawing of an I/O adapter board in accordance with the present invention.

Board 306, the I/O adapter board, includes the functionality described below. Further, to see how board 306 looks in more detail and separated from board 300, FIG. 4 shows an illustration of the I/O adapter board 400 in its unpopulated state. The I/O adapter board shown in FIG. 4 is designed for use with an industry standard CPU board having an ATX type form factor, and for use in a popular IGT® game cabinet, forming thereby a swap-fit replacement for the IGT® processor board that came with the game originally. The I/O adapter and processor board provide significantly enhanced functional capabilities.

The functionality of the I/O adapter board may be grouped into two categories. The first category of functionality is that needed to provide, for each particular preexisting game cabinet, the unique optical or electronic interfaces between the game cabinet's existing apparatus and the new processor board. These interfaces will include both basic electronic or optical interfaces, accounting for differences in everything from voltage levels to power needs to basic signal propagation, up to any needed communications protocol translations or interfaces (all this will be very depending on each particular game cabinet and CPU board). In additional to supporting the needed base functionality, in one preferred embodiment each I/O adapter board provides additional functionality and support not previously found in the game cabinet. A primary example of this added support would be an Ethernet connection, which may be used to provide supplemental network support to the game machines, or may be used to replace the older serial communications ports found in existing gaming cabinets. In addition to all this, of course, is simply the increased processing power available from the new processor board. In the case of the I/O adapter board for the IGT® game cabinet illustrated in FIG. 4, functionality includes the following.

Power to the processor board is supplied using voltage and power regulators adapted to use the +13V and +25V power supplies in the game cabinet, to supply regulated power. Four more com ports are supplied (in addition to the four supplied by the industry standard processor board) for a total of eight com ports. One com port is brought to the front of the processor board or tray where it may be used with an optional touchscreen controller.

A VGA port and a keyboard port are supplied in the I/O adapter board to allow a game independent monitor and input/output device to be hooked up to the game cabinet for development, troubleshooting, and monitoring purposes. For this application, the VGA port is also used to drive the game cabinet's standard video monitor.

An Ethernet connection is provided that may be used in addition to, and eventually in place of, the standard game cabinet's serial port connection to RGCs or other gaming equipment, or the rest of the casino's networked infrastructure. The Ethernet may be used to provide two-level authentication, which further enables age verification and other capabilities as described in co-pending application Ser. No. 09/908,878 entitled "Enhanced Player Authentication Using Biometric Identification", incorporated herein by explicit reference. Further, the Ethernet connection may be used to enable the use of web-based interfaces between machines, both locally and remotely.

The IGT® game cabinet currently under discussion uses a proprietary serial multi-drop RS485-based communications channel for several devices on the same wire. The I/O adapter board has been designed to have only the bill validator connected using this particular RS485 channel. Other devices are connected using other serial connectors built into the I/O adapter board. Since other devices, such as touch-screen controllers, are controlled by other interface means provided by the replacement board, resulting in one device coupled to the original single serial line, there is no need for any type of multi-device communications protocol on the RS485 channel. With only a single device on the channel, any issues surrounding the use of a proprietary serial interface for multiple devices are avoided. The I/O adapter board further provides an interface for the game cabinet's SENET circuitry (a readily available protocol), which interfaces to the display lights, player buttons, etc.

Further, the I/O adapter board includes NVRAM with power management and a battery backup to save any needed game device state in the event of a power loss.

Additionally, the I/O adapter board may be reconfigured in the future, and replaced as an individual item separately from the processor board, to incorporate any additional functionality that is needed by newer games, new markets, or newer player input/output devices. Examples include but are not limited to better graphics, better sound, interactive web capabilities using a high speed network connection such as 100 MB Ethernet, multiple game support, audio support for players with limited eyesight capabilities, and newer, more interactive player I/O devices. The same concept holds true of the processor (or CPU) board. The CPU board may be replaced separately from the I/O adapter board. This allows very economical upgrades of the game cabinet to be carried out in those situations where a new CPU board may be all that is needed to support, for example, games requiring a higher performance CPU but nothing else.

Additionally, if the CPU board ever fails, the replacement is significantly less expensive than the older proprietary boards. Not only that, this avoids the problem of finding replacements for aging electronics. Because the two-board processor board set of the present invention uses an industry standard form and function, if existing CPUs, busses, etc., become unavailable (which can happen quickly, given that many designs have a total life span of less than two years now) the game may be kept in operation by replacing the CPU board, or both the I/O adapter board and CPU board. This circumvents the problem of finding replacement electronic components of an older board that are no longer being manufactured.

This further addresses the very significant issue of obsolescing OEM boards. In the high tech industry, after a board product has been out a few years, it becomes increasingly likely that at least some, if not most, of the boards components (chips) will gradually become unavailable. When this happens, it sometimes becomes impossible to continue manufacturing the same OEM boards as replacements for failed boards, even if the original game cabinet manufacturer wanted to continue to supply parts (and many do not, after a certain point in time). The OEM is now faced with re-engineering a new replacement CPU board for an older, low-demand game cabinet. That will rarely ever be done. The two-board processor board set addresses this problem by allowing the I/O adapter board to be produced relatively inexpensively, providing continuing life of older game cabinets through the use of standard form-factor CPU boards with the I/O adapter board.

Figure 5:
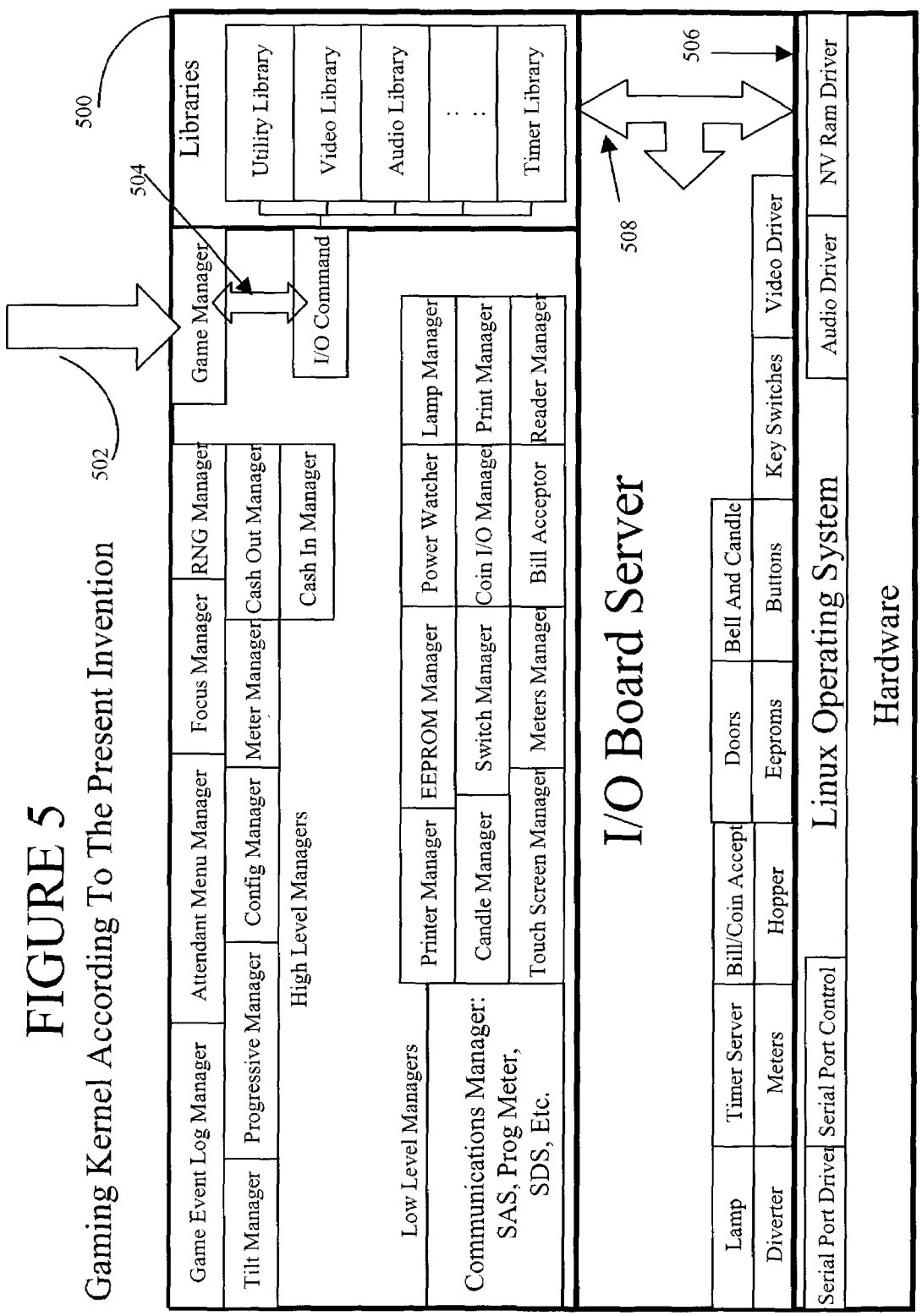
FIG. 5 is a functional block diagram showing a gaming kernel according to the present invention.

FIG. 5 is an functional block diagram of the gaming kernel 500 of the present invention. Game software uses the gaming kernel and two-board processor board set by calling into application programming interface (API) 502, which is part of the game manager.

There are three layers: the two-board processor board set (hardware); the Linux operating system; and, the game kernel layer (having the game manager therein). The third layer executes at the user level, and itself contains a major component called the I/O Board Server. Note the unique architecture of the gaming kernel: ordinarily, the software identified as the I/O Board Server would be inside the Linux kernel as drivers and controllers. It was decided that as many functions normally found in a UNIX (in this case, LINUX) kernel would be brought to the user level as possible. In a multi-user or non-dedicated environment, this would cause performance problems and possibly security problems. It has been discovered that in a gaming machine, those risks are manageable. Performance is maintained due to the control of overall system resource drains in a dedicated environment, coupled with ability to choose a suitably fast processor as part of the two-board processor board set. Additionally, gaming software is highly regulated so the ordinary security concerns one would find in an open user environment (or where uncontrolled applications may be run) does not exist in gaming machines. Game application software is well behaved, creating a benign environment as far as attacks from installed software are concerned. To properly set the bounds of game application software (making integrity checking easier), all game applications interact with the gaming kernel using a single application program interface in the game manager. This enables game applications to make use of a well-defined, consistent interface as well as making access points to the gaming kernel controlled, where overall access is controlled using separate processes.

The game manager parses the incoming command stream and, when a command dealing with I/O comes in 504, it is sent to the applicable library routine (the actual mechanisms used are the UNIX or LINUX IPC capabilities). The library routine decides what it needs from a device, and sends commands to the I/O Board Server (arrow 508). Note that a few specific drivers are still in the UNIX/LINUX kernel, shown as those below line 506. These are built-in, primitive, or privileged drivers that were (i) general (ii) kept to a minimum and (iii) were easier to leave than extract. In such cases, the low-level communications is handled within UNIX or LINUX and the contents passed to the library routines.

Thus, in a few cases library routines will interact with drivers inside the operating system which is why arrow 508 is shown as having three directions (between library utilities and the I/O Board Server, or between library utilities and certain drivers in the operating system). No matter which path is taken, the "smarts" needed to work with each device is coded into modules in the user layer of the diagram. The operating system is kept is simple, stripped down, and common across as many platforms as possible. It is the library utilities and user-level drivers that change for each two-board processor board set, as dictated by the game cabinet or game machine in which it will run. Thus, each game cabinet or game machine will have an industry standard processor board connected to a unique, relatively dumb, and as inexpensive as possible I/O adapter board, plus a gaming kernel which will have the game-machine-unique library routines and I/O Board Server components needed to enable game applications to interact with the game machine (game cabinet). Note that these differences will be invisible to the game application software with the exception of certain functional differences (i.e., if a box or cabinet has stereo sound, the game application will be able make use of the API to use the capability over that of a cabinet having traditional monaural sound).

Examples of the "smarts" built into user-level code of the present invention includes the following. One example is using the I/O library to write data to the gaming machine EEPROM, which is located in the gaming machine cabinet and holds meter storage that must be kept even in the event of power failure. The game manager calls the I/O library function to write data to the EEPROM. The I/O Board Server receives the request and starts a low priority thread within the server to write the data. This thread uses a sequence of 8 bit command and data writes to the EEPROM device to write the appropriate data in the proper location within the device. Any errors detected will be sent as IPC messages to the game manager. All of this processing is asynchronous.

Another example is the button module within the I/O Board Server, which pools (or is sent) the state of buttons every 2 ms. These inputs are debounced by keeping a history of input samples. Certain sequences of samples are required to detect the button was pressed, in which case the I/O Board Server sends an IPC event to the game manager that a button was pressed or released. For some machines with intelligent distributed I/O which debounces the buttons, the button module may be able to communicate with the remote intelligent button processor to get the button events and relay them to the game manager via IPC messages.

Another example is the use of the I/O library for pay out requests from the game application. The I/O Board Server must start the hopper motor, constantly monitor the coin sensing lines of the hopper, debounce them, and send an IPC message to the game manager when each coin is paid.

The I/O library interface has been designed so that the I/O Board Server does not require novram data storage. All novram state flow is programmed in the game manager level (using library utilities) so that it is consistent across all platforms. The I/O Board Server also contains intelligence and a lot of state information. The intelligence needed to interface with each device is found in the combination of I/O library routines and the I/O Board Server.

The use of a UNIX-based operating system allows the game developers interfacing to the gaining kernel to use any of a number of standard development tools and environments available for the UNIX or LINUX OS. This is a huge win over the prior art in casino game development, which required game developers to use low level, proprietary interfaces for their games. The use of proprietary, low level interfaces in turn requires significant time and engineering investments for each game upgrade, hardware upgrade, or feature upgrade. The present invention is a very significant step in reducing both development costs and enhancement costs as viewed by game developers. In particular, this will enable smaller game developers to reasonably compete with the larger, more established game developers by significantly reducing engineering time using a UNIX or LINUX environment. Savings include but are not limited to reduced development time, reduced development costs, and the ability to use the gaming kernel and its two-board processor board set to market a single game for many game cabinets, spanning multiple game machine vendors. This is a remarkable and significant breakthrough for the gaining industry, being an additional breakthrough beyond simply providing a standard UNIX-like interface to a game developer.

Some gaming kernel components are next described. The gaming kernel of the present invention is also called the Alpha Game Kit kernel or Alpha Game Kit game kernel, abbreviated AGK game kernel or AGK kernel.

The Game Manager provides the interface into the AGK game kernel, providing consistent, predictable, and backwards compatible calling methods, syntax, and capabilities (game application API). This enables the game developer to be free of dealing directly with the hardware, including the freedom to not have to deal with low-level drivers as well as the freedom to not have to program lower level managers (although lower level managers may be accessible through the Game Manager's interface if a programmer has the need). In addition the freedom derived from not having to deal with the hardware level drivers and the freedom of having consistent, callable, object oriented interfaces to software managers of those components (drivers), the game manager provides access to a set of upper level managers also having the advantages of consistent callable, object oriented interfaces, and further providing the types and kinds of base functionality required in all casino-type games. The game manager, providing all the advantages of its consistent and richly functional interface as support by the rest of the AGK kernel, thus provides the game developer with a multitude of advantages.

The Game Manager has several objects within itself, including an Initialization object. The Initialization object performs the initialization of the entire game machine, including other objects, after the game manager has started its internal objects and servers in appropriated order. In order to carry out this function, the Configuration Manager is amongst the first objects to be started; the Configuration manager has data needed to initialize (correctly configure) other objects or servers.

After the game is brought up (initialized) into a known state, the Game Manager checks the configuration and then brings either a game or a menu object. The game or menu object completes the setup required for the application to function, including but not limited to setting up needed callbacks for events that are handled by the event manager, after which control is passed back to the Game Manager. The Game Manager now calls the game application to start running; the game machine is made available for player use.

While the game application is running (during game play, typically), the application continues to make use of the Game Manager. In addition to making function calls to invoke functionality found in the AGK kernel, the application will receive, using the callbacks set up during initialization and configuration, event notification and related data. Callback functionality is suspending if an internal error occurs ("Tilt event") or if a call attendant mode is entered. When this state is cleared, event flow continues.

In a multi-game or menu-driven environment, the event callbacks set by a game application during its initialization are typically cleared between applications. The next application, as part of its initialization sequence, sets any needed callbacks. This would occur, for example, when a player ends one game, invokes a menu (callbacks cleared and reset), then invokes a different game (callbacks cleared and reset).

The Game Event Log Manager is to provide, at the least, a logging or logger base class, enabling other logging objects to be derived from this base object. The logger (logger object) is a generic logger; that is, it is not aware of the contents of logged messages and events. The Log Manager's job is to log events in NVRAM event log space. The size of the space if fixed, although the size of the logged event is not. When the event space or log space fills up, a preferred embodiment will delete the oldest logged event (each logged event will have a time/date stamp, as well as other needed information such as length), providing space to record the new event. In this embodiment the latest events will be found in NVRAM log space, regardless of their relative importance. Further provided is the capability to read the stored logs for event review.

The Meter Manager manages the various meters embodied in the AGK kernel. This includes the accounting information for the game machine and game play. There are hard meters (counters) and soft meters; the soft meters are stored in NVRAM to prevent loss. Further, a backup copy of the soft meters is stored in EEPROM. In one preferred embodiment, the Meter Manager receives its initialization data for the meters, during startup, from the Configuration (Config) Manager. While running, the Cash In and Cash Out Managers call the Meter Manager's update functions to update the meters, and the Meter Manager will, on occasion, create backup copies of the soft meters by storing the soft meters readings in EEPROM; this is accomplished by calling and using the EEPROM Manager.

The Progressive Manager manages progressive games playable from the game machine. It receives a list of progressive links and options from the Config Manager on startup; the Progressive Manager further registers progressive event codes ("events") and associated callback functions with the Event Manager to enable the proper handling of progressive events during game play, further involving other components such as Corn Manager, perhaps the Meters Manager, and any other associated or needed modules, or upper or lower level managers. This enables the game application to make use of a progressives known to the game machine via the network in the casino; the progressives may be local to the casino or may extend beyond the casino (this will be up to the casino and its policies).

The Event Manager object is generic, like the Log Manager. The Event Manager does not have any knowledge of the meaning of events; rather, its purpose is to handle events. The Event Manager is driven by its users; that is, it records events as passed to it by other processes, and then uses its callback lists so that any process known to the Event Manager and having registered a callback event number that matches the event number given to the Event Manager by the event origination process, will be signaled ("called"). Each event contains fields as needed for event management, including as needed and designed, a date/time stamp, length field, an event code, and event contents.

The Focus Manager object correlates which process has control of which focus items. During game play, objects can request a focus event, providing a callback function with the call. This includes the ability to specify lost focus and regained focus events. In one embodiment, the Focus Manager uses a FIFO list when prioritizing which calling process gets their callback functions handled relating to a specific focus item.

The Tilt Manager is an object that receives a list of errors (if any) from the Configuration Manager at initialization, and during play from processes, managers, drivers, etc., that generate errors. The Tilt Manager watches the overall state of the game, and if a condition or set of conditions occur that warrant it, a tilt message is sent to the game application. The game application then suspends play, resumes play, or otherwise responds to the tilt message as needed.

The Random Number Generator Manager is provided to allow easy programming access to a random number generator (RNG), as a RNG is required in virtually all casino-style (gambling) games. The RNG Manager includes the capability of using multiple seeds by reading RNG seeds from NVRAM; this can be updated/changed as required in those jurisdictions that require periodic seed updates.

The Credit Manager object manages the current state of credits (cash value or cash equivalent) in the game machine. The Cash In and Cash Out objects are the only objects that have read privileges into the Credit Manager; all other objects only have read capability into the public fields of the Credit Manager. The Credit Manager keeps the current state of the credits available, including any available winnings, and further provides denomination conversion services.

The Cash Out Manager has the responsibility of configuring and managing monetary output devices. During initialization the Cash Out Manager, using data from the Configuration Manager, sets the cash out devices correctly and selects any selectable cash out denominations. During play, a game application may post a cash out event through the Event Manager (the same way all events are handled), and using the callback posted by the Cash Out Manager, the Cash Out Manager is informed of the event. The Cash Out Manager updates the Credit Object, updates its state in NVRAM, and sends an appropriate control message to the device manager that corresponds to the dispensing device. As the device dispenses dispensable media, there will typically be event messages being sent back and forth between the device and the Cash Out Manager until the dispensing finishes, after which the Cash Out Manager, having updated the Credit Manager and any other game state (such as some associated with the Meter Manager) that needs to be updated for this set of actions, sends a cash out completion event to the Event Manager and to the game application thereby.

The Cash In Manager functions similarly to the Cash Out Manager, only controlling, interfacing with, and taking care of actions associated with cashing in events, cash in devices, and associated meters and crediting.

Further details, including disclosure of the lower level fault handling and/or processing, are included in the provisional from which this utility application receives date precedence, entitled "Form Fitting Upgrade Board Set For Existing Game Cabinets" and having No. 60/313,743, said provisional being fully incorporated herein by explicit reference.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Although the description above contains much specificity, the description should not be construed as limiting the scope of the invention; the descriptions given are merely providing an illustration of embodiments of the invention. The scope of this invention is determined by the appended claims and their legal equivalents.

What is claimed is:

1. A board set and gaming kernel for a game device comprising:
    an upgraded processor board having an industry standard form factor and configured as a single-board system that supports an operating system, and wherein the upgraded processor board has at least one connector operably interfaced thereto;
    an input/output (I/O) adapter board having at least one connector operably interfaced thereto and connectable to said at least one connector on said upgraded processor board, and configured to have at least one interface for connecting to at least one gaming cabinet, and further having a form factor configured to attach to said upgraded processor board using said at least one connector, wherein the combination of said upgraded processor board and said I/O board provides enhanced functionality as compared to an original equipment manufacturer (OEM) processor board; and
    the gaming kernel comprising:
        the operating system associated with said upgraded processor board;
        a game manager operably disposed in a layer above said operating system, wherein the game manager drives independent game-specific processes that are not utilized as game shared objects, wherein said game manager includes a single application program interface useable by game applications for communication with the game manager, and wherein the game applications are non-shared, executable objects; thereby enhancing game security and design flexibility;
        an I/O board server operably disposed in the layer above said operating system; and
        user level modules operably disposed in the layer above said operating system, wherein said user level modules are configured to send, receive, and process information from gaming machine I/O devices, and wherein said user level modules and said I/O board server are configured to perform logical operations associated with operation of at least one gaming machine I/O device connectable to said adapter board, wherein said gaming kernel facilitates a conversion of the upgraded processor board to a game-specific processor board for the gaming device.

2. The board set and gaming kernel of claim 1, wherein the user level modules to process information for at least one of: candles, bells, lamps, doors, key switches, buttons, hoppers, meters, bill acceptors, card readers, voucher readers, printers, or display lamps.

3. The board set and gaming kernel of claim 1 further comprising additional I/O functionality on said I/O adapter board not found on said processor board.

4. The board set and gaming kernel of claim 3, wherein said I/O adapter board further comprises at least 4 additional communications ports.

5. The board set and gaming kernel of claim 3, wherein said additional I/O functionality comprises stereo sound capabilities.

6. The board set and gaming kernel of claim 3, wherein said additional I/O functionality comprises an ethernet interface.

7. The board set and gaming kernel of claim 1, wherein said at least one connector on said processor board comprises at least one bus connector.

8. The board set and gaming kernel of claim 1, wherein said interface on said I/O adapter board is a SENET-compatible interface.

9. The board set and gaming kernel of claim 1, wherein said interface of said I/O adapter board further comprises a player button control interface.

10. The board set and gaming kernel of claim 1, wherein said I/O adapter board further comprises a video display interface.

11. The board set and gaming kernel of claim 1, wherein said operating system further comprises drivers for at least one hardware device that interface with said I/O adapter board.

12. The board set and gaming kernel of claim 1, wherein said interface of said I/O adaptor board is compatible with an interface of a used game cabinet.

13. The board set and gaming kernel of claim 12, wherein said processor board and said I/O adapter are connected using said at least one connector, and where said connected boards form a shape and size enabling use of OEM mounts in said used game cabinet.

14. The board set and gaming kernel of claim 1, wherein said processor board and said I/O adapter board are connected using at least one connector, wherein said connected boards form a two board set shaped and sized to conform to a rack-mount industry standard form factor.

15. A game machine comprising:
   a game cabinet having an original equipment manufacturer (OEM) processor board mounting system sized to accommodate an OEM processor board, and further comprising interactive player devices and passive player devices, wherein said player devices having electronic interfaces;
   an upgraded processor board having an industry standard form-factor that is configured as a single-board system that supports an operating system, and wherein said upgraded processor board has at least one connector operably interfaced to said upgraded processor board;
   an input/output (I/O) adapter board, said I/O adapter board having at least one connector compatible with at least one of said at least one connector on said upgraded processor board, said I/O adapter board operably providing at least one additional function beyond that provided by said upgraded processor board, and said I/O adapter board configured to have at least one functional interface for said player devices, and wherein said player devices are operably connected to said functional interface, wherein said upgraded processor board is connected to said I/O adapter board to form a two board assembly sized and shaped to fit in said OEM processor board mounting system; and
   the gaming kernel comprising:
      an operating system associated with said processor board;
      a game manager operably disposed in the layer above said operating system, wherein the game manager drives game-specific processes that are not utilized as game shared objects, wherein said game manager includes a single application program interface useable by game applications for communication with the game manager, and wherein the game applications are non-shared, executable objects; thereby enhancing game security and design flexibility;
      an I/O board server operably disposed in the layer above said operating system; and
      user level modules operably disposed in the layer above said operating system, wherein said user level modules are configured to send, receive, and process information from gaming machine I/O devices, and wherein said user level modules and said I/O board server are configured to perform logical operations associated with operation of at least one gaming machine I/O device connectable to said adapter board, wherein said gaming kernel facilitates a conversion of the upgraded processor board to a game-specific processor board for a gaming device.

16. The game machine of claim 15, further comprising at least one game application operably running thereon, enabling a player to play at least one game.

17. The game machine of claim 15, wherein said industry standard form factor is one of: ATX, MicroATX, FlexATX, or NLX.

18. The game machine of claim 15, wherein said industry standard form factor is a rack mount form factor.

19. The game machine of claim 15, wherein said I/O adapter board comprises at least 4 additional communications ports.

20. The game machine of claim 15, wherein said at least one additional function comprises stereo sound capabilities.

21. The game machine of claim 15, wherein said OEM processor board mounting system is initially designed to mount said original equipment manufacturer (OEM) processor board is operably coupled with said I/O adapter board.

22. A method for providing an upgraded and upgradeable game machine using an existing game machine, the method comprising:
   having a used gaming machine comprising a gaming cabinet with original equipment manufacturer (OEM) processor board mounts and one or more player devices;
   providing a two-board processor board set comprising an upgraded processor board connected to an I/O adapter board, wherein said connected processor board and I/O adapter board form an overall shape and size enabling the use of said OEM processor board mounts;
   providing a game kernel associated with said upgraded processor board, wherein said game kernel comprises an operating system, a game manager, I/O board server, and user level modules running on top of said operating system,
   wherein said game manager is operably disposed in a layer above said operating system, wherein the game manager drives game-specific processes that are not utilized as game shared objects, wherein said game manager includes a single application program interface useable by game applications for communication with the game manager, and wherein the game applications are non-shared, executable objects; thereby enhancing game security and design flexibility;
   wherein said user level modules and said I/O board server are configured to provide programming to enable interaction with said player devices; and
   installing said two-board processor board set in said OEM processor board mounts.

23. The method of claim 22 further comprising:
   removing said two-board processor board set from said game cabinet;
   separating said two-board processor board set into said upgraded standard processor board and said I/O adapter board;
   connecting an industry standard processor board to said previously installed I/O adapter board different to form a different two-board processor board set configured to be installed in said gaming machine; and
   installing said different two-board processor board set in said OEM processor board mounts.

24. The method of claim 22 further comprising:
   removing said two-board processor board set from said game cabinet;
   separating said two-board processor board set into said upgraded processor board and a said previously installed I/O adapter board;
   connecting a different I/O adapter board to said upgraded industry standard processor board to form a different two-board processor board set configured to be installed in said gaming machine; and
   installing said different two-board processor board set in said OEM processor board mounts.

25. The method of claim 22 further comprising:

installing game software that interfaces to said gaming kernel;

configuring said gaming kernel to operably interact with said existing game cabinet; and enabling said game software to allow at least one player to play at least one game using said player devices in said game cabinet.

26. A method for providing a cost effective alternative to the purchase of an original equipment manufacturer (OEM) processor board in an existing game cabinet, the method comprising:

having a gaming machine with an OEM processor board mounted inside said gaming machine via an OEM mounting system;

providing a two-board processor board set comprising an industry standard processor board connected to an I/O adapter board, wherein the connected boards are shaped and sized to enable the use of said OEM mounting system;

providing a game kernel associated with said industry standard processor board, wherein said game kernel comprises an operating system, a game manager, I/O board server, and user level modules running on top of said operating system, wherein said user level modules and said I/O board server are configured to provide programming to enable interaction between any desired device in said gaming machine and said game manager, wherein said game manager drives game-specific processes that are not utilized as game shared objects, wherein said game manager includes a single application program interface useable by game applications for communication with the game manager, and wherein the game applications are non-shared, executable objects; thereby enhancing game security and design flexibility; and installing said two-board processor board set in said gaming machine using said OEM mounting system.

27. The method of claim 26 further comprising:

providing game application software which uses said application program interface; and allowing game play using said game application software.

28. The method of claim 27 further comprising:

removing said two-board processor board set from said game cabinet;

separating said two-board processor board set into said industry standard processor board and said previously installed I/O adapter board;

connecting a new processor board to said previously installed I/O adapter board to form a different two-board processor board set installable in said gaming machine; and installing said different two-board processor board set in said game cabinet using said OEM mounting system.

29. The method of claim 28 further comprising:

providing an expanded application program interface in said game manager that enables use of at least one enhanced feature if said at least one enhanced feature is usable by a game application program; and configuring said game application software to run unaltered using said expanded application program interface.

30. The method of claim 26 further comprising:

removing said two-board processor board set from said gaming cabinet;

separating said two-board processor board set into said industry standard processor board and said previously installed I/O adapter board;

connecting a new I/O adapter board to said previously installed processor board to form a different two-board processor board set installable in said gaming machine; and installing said different two-board processor board set in said game cabinet using said OEM mounting system.

31. The method of claim 30 further comprising:

providing an expanded application program interface in said game manager that enables use of at least one enhanced feature if said at least one enhanced feature is usable by a game application program; and configuring said game application software to run unaltered using said expanded application program interface.

* * * * *